(12) United States Patent
Horst et al.

(10) Patent No.: US 11,225,279 B2
(45) Date of Patent: Jan. 18, 2022

(54) CHILD SEAT AND FOLDABLE STROLLER THEREOF

(71) Applicant: Wonderland Switzerland AG, Steinhausen (CH)

(72) Inventors: Andrew J. Horst, West Lawn, PA (US); Daniel A. Sack, Pottstown, PA (US)

(73) Assignee: Wonderland Switzerland AG, Steinhausen (CH)

(*) Notice: Subject to any disclaimer, the term of this patent is extended or adjusted under 35 U.S.C. 154(b) by 64 days.

(21) Appl. No.: 16/869,604

(22) Filed: May 8, 2020

(65) Prior Publication Data

US 2020/0353968 A1 Nov. 12, 2020

Related U.S. Application Data

(60) Provisional application No. 62/845,504, filed on May 9, 2019.

(51) Int. Cl.
  *B62B 7/08* (2006.01)
  *B62B 7/14* (2006.01)
  *B62B 9/26* (2006.01)
  *B62B 7/06* (2006.01)

(52) U.S. Cl.
  CPC ............... *B62B 7/08* (2013.01); *B62B 7/064* (2013.01); *B62B 7/145* (2013.01); *B62B 9/26* (2013.01); *B62B 2205/006* (2013.01); *B62B 2205/20* (2013.01)

(58) Field of Classification Search
  CPC .......... B62B 7/08; B62B 7/145; B62B 7/164; B62B 9/26; B62B 2205/006; B62B 2205/20
  See application file for complete search history.

(56) References Cited

U.S. PATENT DOCUMENTS

| | | | | |
|---|---|---|---|---|
| 3,459,435 A * | 8/1969 | Garner | ...................... | B62B 7/08 280/644 |
| 3,556,546 A * | 1/1971 | Garner | ...................... | B62B 7/08 280/644 |
| 3,873,116 A * | 3/1975 | Perego | ...................... | B62B 7/08 280/650 |
| 6,523,853 B1 * | 2/2003 | Cheng | ...................... | B62B 7/06 280/642 |
| 2010/0308550 A1 * | 12/2010 | Li | ........................... | B62B 9/203 280/38 |

(Continued)

*Primary Examiner* — Erez Gurari
(74) *Attorney, Agent, or Firm* — Fay Kaplun & Marcin, LLP

(57) ABSTRACT

A child seat is detachably mounted on a foldable stroller comprising a stroller handle and front and rear leg portions. The stroller handle is foldably connected to the rear leg portion. The front leg portion is foldably connected to the rear leg portion and has a first adaptor. The child seat includes a first pivot and a seat frame having a lower seat portion and an upper seat portion foldably connected to the lower seat portion. The first pivot is pivotably connected to the lower seat portion and detachably mounted on the first adaptor. When the front leg portion and the stroller handle are folded relative to the rear leg portion, the upper seat portion is folded on the lower seat portion, and the lower seat portion is folded on the front leg portion via the first pivot together with the upper seat portion.

17 Claims, 5 Drawing Sheets

(56) References Cited

U.S. PATENT DOCUMENTS

| | | | |
|---|---|---|---|
| 2013/0113185 A1* | 5/2013 | Zehfuss | B62B 9/102 280/647 |
| 2013/0113188 A1* | 5/2013 | Liao | B62B 7/08 280/650 |
| 2014/0191483 A1* | 7/2014 | Rolicki | B62B 9/20 280/47.41 |
| 2014/0334867 A1* | 11/2014 | Su | B62B 7/062 403/106 |
| 2015/0151774 A1* | 6/2015 | Liu | B62B 7/08 403/103 |
| 2015/0183450 A1* | 7/2015 | Chen | B62B 9/26 280/47.35 |
| 2015/0197270 A1* | 7/2015 | Sundberg | B62B 9/12 280/642 |
| 2017/0217471 A1* | 8/2017 | Haut | B62B 9/28 |
| 2017/0297599 A1* | 10/2017 | Zhong | F16B 12/06 |
| 2017/0313337 A1* | 11/2017 | Horst | B62B 7/062 |
| 2019/0217879 A1* | 7/2019 | Gibson | B62B 7/142 |
| 2019/0351929 A1* | 11/2019 | Williams | B62B 9/203 |
| 2020/0239058 A1* | 7/2020 | Zhang | B62B 7/062 |
| 2020/0353966 A1* | 11/2020 | Taylor | B62B 7/145 |
| 2020/0353967 A1* | 11/2020 | Horst | B62B 7/062 |
| 2020/0353968 A1* | 11/2020 | Horst | B62B 7/14 |
| 2021/0094601 A1* | 4/2021 | Wu | B62B 7/06 |

\* cited by examiner

CHILD SEAT AND FOLDABLE STROLLER THEREOF

CROSS REFERENCE TO RELATED APPLICATIONS

This application claims the benefit of U.S. Provisional Application No. 62/845,504, which was filed on May 9, 2019, and is incorporated herein by reference.

BACKGROUND OF THE INVENTION

1. Field of the Invention

The present invention relates to a child seat and a foldable stroller thereof, and more specifically, to a child seat detachably mounted on a front leg portion of a foldable stroller and foldable on the front leg portion and a foldable stroller thereof.

2. Description of the Prior Art

Rapid developed economics and technology provide people with various consumer products, such as a stroller. The stroller not only allows a user to operate it with one hand to reduce his burden when taking an infant out, but also makes the infant sit thereon comfortably. Thus, the stroller has become more and more popular in infant caring.

In general, the stroller is composed of a stroller frame and a child seat assembled with the stroller frame for holding the infant, and allows the child seat to be detachably attached to the stroller frame in multiple configurations (e.g. forward and rearward facing configurations). However, since the stroller frame usually cannot be folded to a compact size together with the child seat, it causes the user much inconvenience in folding of the stroller and storage of the folded stroller.

SUMMARY OF THE INVENTION

The present invention provides a child seat detachably mounted on a foldable stroller. The foldable stroller includes a stroller handle, a front leg portion, and a rear leg portion. The stroller handle is foldably connected to the rear leg portion. The front leg portion is foldably connected to the rear leg portion and has a first adaptor. The child seat includes a seat frame and a first pivot. The seat frame has an upper seat portion and a lower seat portion. The upper seat portion is foldably connected to the lower seat portion. The first pivot is pivotably connected to the lower seat portion and detachably mounted on the first adaptor to make the child seat disposed on the front leg portion. When the front leg portion and the stroller handle are folded relative to the rear leg portion, the upper seat portion is folded on the lower seat portion, and the lower seat portion is folded on the front leg portion via the first pivot together with the upper seat portion.

The present invention further provides a foldable stroller including a rear leg portion, a stroller handle, a front leg portion, and a child seat. The stroller handle is foldably connected to the rear leg portion. The front leg portion is foldably connected to the rear leg portion. The front leg portion has a first adaptor. The child seat includes a seat frame and a first pivot. The seat frame has an upper seat portion and a lower seat portion. The upper seat portion is foldably connected to the lower seat portion. The second pivot is foldably connected to the lower seat portion and detachably mounted on the first adaptor to make the child seat disposed on the front leg portion. When the front leg portion and the stroller handle are folded relative to the rear leg portion, the upper seat portion is folded on the lower seat portion, and the lower seat portion is folded on the front leg portion via the first pivot together with the upper seat portion.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
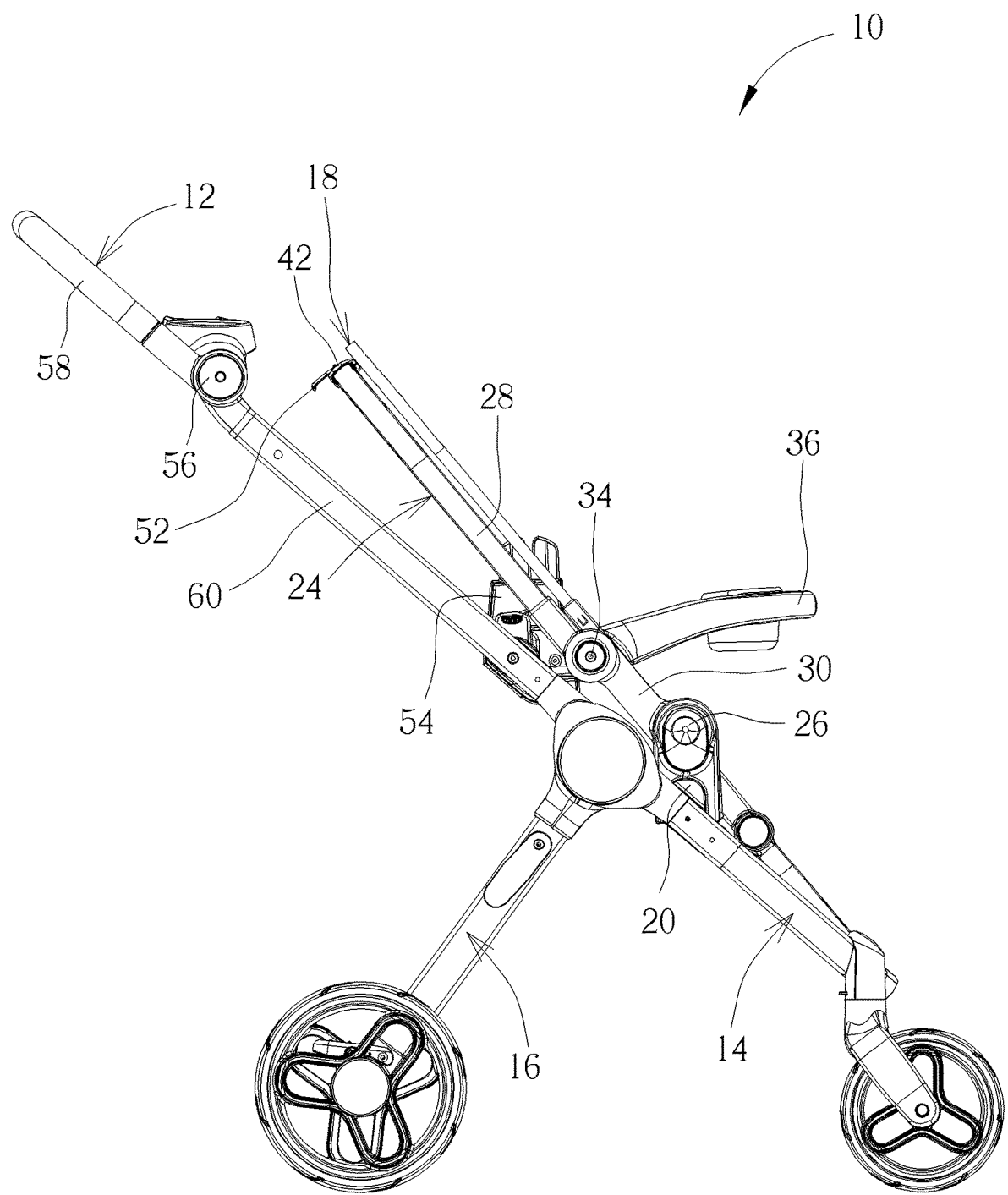
FIG. 1 is a side view of a foldable stroller according to an embodiment of the present invention.

Please refer to FIG. 1, which is a side view of a foldable stroller 10 according to an embodiment of the present invention. As shown in FIG. 1, the foldable stroller 10 includes a stroller handle 12, a front leg portion 14, a rear leg portion 16, and a child seat 18. The stroller handle 12 is foldably connected to the rear leg portion 16. The front leg portion 14 is foldably connected to the rear leg portion 16 and has a first adaptor 20 for allowing the child seat 18 to be mounted thereon. Via the aforesaid design, the stroller handle 12 and the front leg portion 14 can be folded relative to the rear leg portion 16 to form a folded stroller frame of a compact size. To be noted, the first adaptor 20 could be preferably slidable along the front leg portion 14 (e.g. via a sliding rail disposed on the front leg portion 14) such that a user can adjust a height of the child seat 18 on the front leg portion 14.

Figure 2:
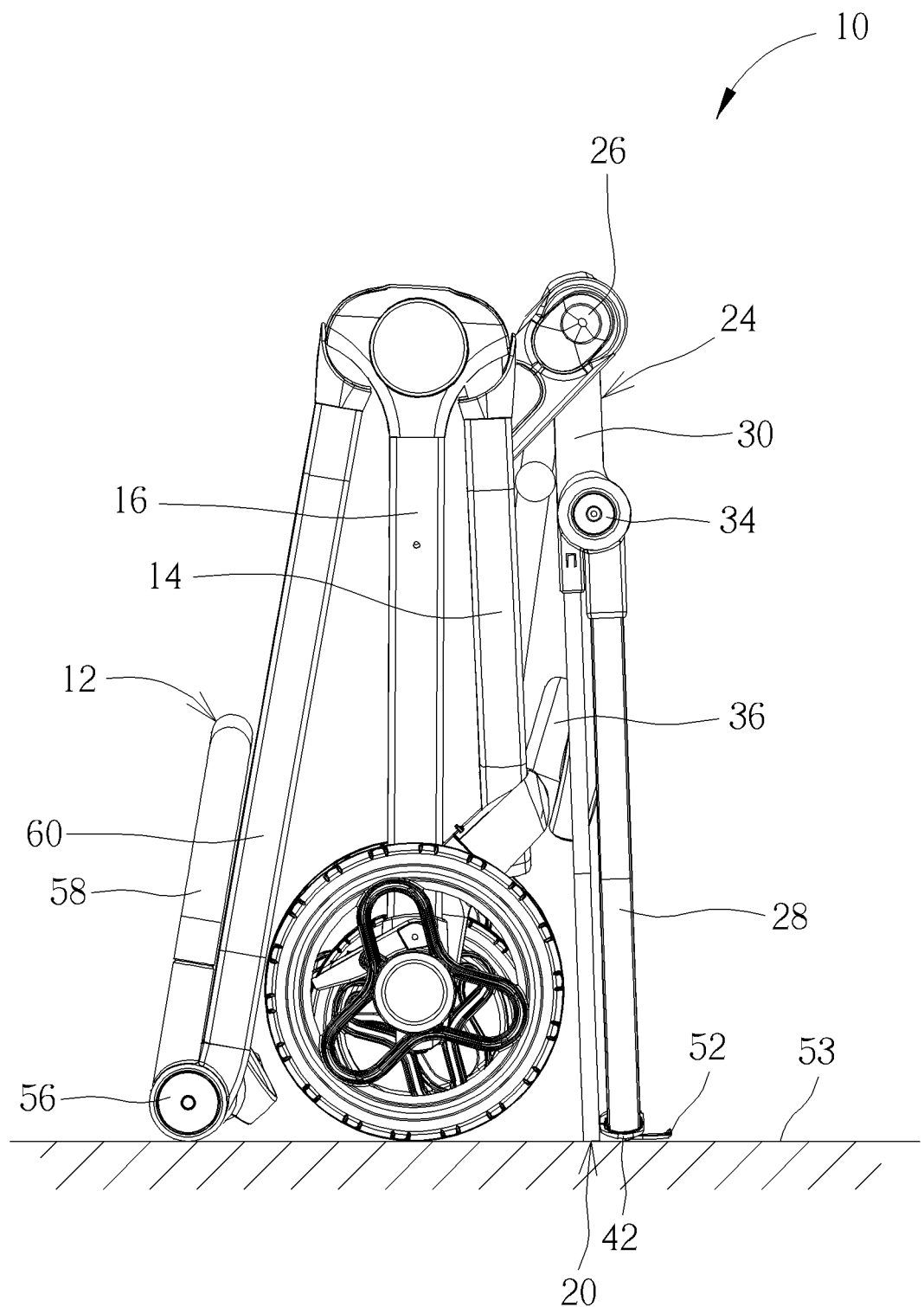
FIG. 2 is a folding diagram of the foldable stroller in FIG. 1.

More detailed description for the folding design of the child seat 18 is provided as follows. Please refer to FIG. 1 and FIG. 2. FIG. 2 is a folding diagram of the foldable stroller 10 in FIG. 1. As shown in FIG. 1 and FIG. 2, the child seat 18 includes a seat frame 24 and a first pivot 26. The seat frame 24 has an upper seat portion 28 and a lower seat portion 30. The upper seat portion 28 is foldably connected to the lower seat portion 30, and the first pivot 26 is pivotably connected to the lower seat portion 30. The first pivot 26 is detachably mounted on the first adaptor 20 to make the child seat 18 disposed on the front leg portion 14. In such a manner, when the front leg portion 14 and the stroller handle 12 are folded relative to the rear leg portion 16 for folding the foldable stroller 10, the upper seat portion 28 can be folded on the lower seat portion 30, and then the lower seat portion 30 can be folded on the front leg portion 14 via the first pivot 26 together with the upper seat portion 28. That is, the lower seat portion 30 and the upper seat portion 28 can be folded on the front leg portion 14, so as to make the foldable stroller 10 capable of being folded together with the child seat 18 to form a compact and easily transported size.

Figure 3:
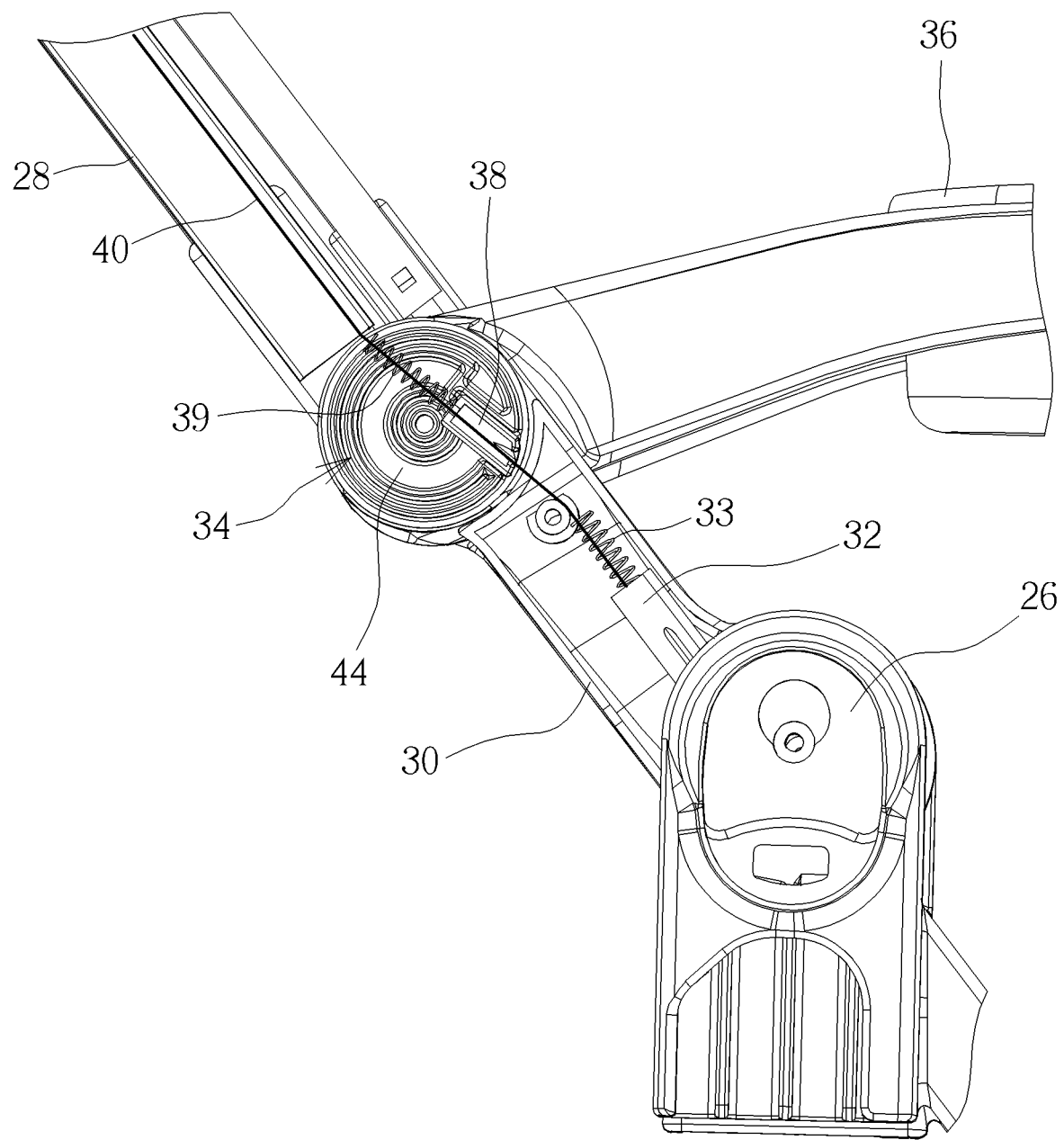
FIG. 3 is a partial internal diagram of the foldable stroller in FIG. 1.

In practical application, the present invention could further adopt a handle releasing design for releasing the child seat 18 to be foldable. For example, please refer to FIG. 1, FIG. 2, and FIG. 3. FIG. 3 is a partial internal diagram of the foldable stroller 10 in FIG. 1. As shown in FIG. 1, FIG. 2, and FIG. 3, the child seat 18 further includes a first locking element 32 (e.g. a plunger, but not limited thereto), a second pivot 34, a second locking element 38 (e.g. a plunger, but not limited thereto), a linkage element 40, and a release handle 42. The first locking element 32 is movably disposed in the lower seat portion 30 for operably engaging with or disengaging from the first pivot 26. The second pivot 34 is pivoted to the lower seat portion 30 and the upper seat portion 28. The second locking element 38 is movably disposed in the upper seat portion 28 for operably engaging with or disengaging from the second pivot 34. The linkage element 40 is connected to the first locking element 32 and the second locking element 38, and the release handle 42 is disposed on the upper seat portion 28 and connected to the linkage element 40. In this embodiment, the linkage element 40 could be preferably a cable passing through the second locking element 38 to be connected to the first locking element 32 for pulling or releasing the second locking element 38 and the first locking element 32 simultaneously, but not limited thereto. That is to say, the present invention could adopt the design the linkage element 40 is connected to the first locking element 32 and the second locking element 38 respectively for independently operating the first locking element 32 and the second locking element 38 in another embodiment, and the related description could be reasoned by analogy according to this embodiment and omitted herein.

Figure 4:
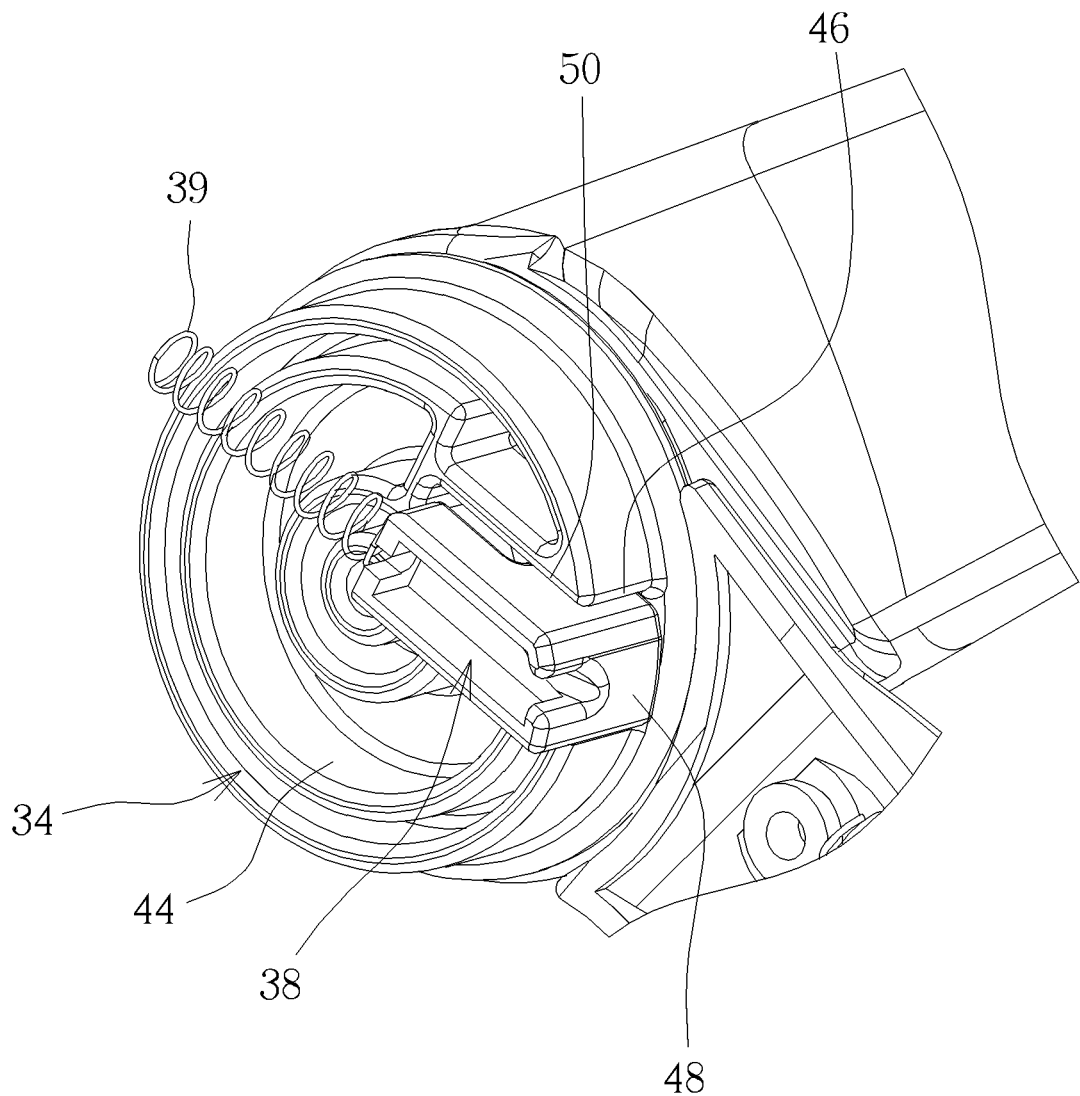
FIG. 4 is an enlarged diagram of a protrusion of a second locking element being engaged with an opening of a second pivot in FIG. 2.

To be more specific, as shown in FIG. 3 and FIG. 4, the second pivot 34 has a concentric track 44 formed therein and an opening 46 communicated with the concentric track 44, and the second locking element 38 has a protrusion 48 protruding toward the opening 46. Accordingly, when the release handle 42 releases the linkage element 40, the second locking element 38 is released to move the protrusion 48 to be engaged with a binding surface 50 of the opening 46 for preventing folding of the upper seat portion 28 relative to the lower seat portion 30. When the release handle 42 pulls the linkage element 40 to move the protrusion 48 from the opening 46 to the concentric track 44, the protrusion 48 is movable along the concentric track 44 for making the upper seat portion 28 foldable relative to the second pivot 34.

Moreover, as shown in FIG. 1, the child seat 18 could further include a tray 36 (could be omitted for simplifying the mechanical design of the child seat 18) foldably connected to the upper seat portion 28 via the second pivot 34, but not limited thereto. For example, the child seat 18 could further include an armrest foldably connected to the upper seat portion 28 via the second pivot 34 in another embodiment, and the related description could be reasoned by analogy according to FIG. 1 and omitted herein.

As such, when the release handle 42 is operated to pull the linkage element 40, the linkage element 40 drives the second locking element 38 to disengage from the second pivot 34 for making the tray 36 foldable on the upper seat portion 28 via the second pivot 34. On the other hand, when the release handle 42 is operated to release the linkage element 40, the second locking element 38 is released to engage with the second pivot 34 for preventing folding of the tray 36 relative to the upper seat portion 28.

Via the aforesaid releasing design, when a user wants to perform the folding operation of the child seat 18, the user just needs to operate the release handle 42 for pulling the second locking element 38 and the first locking element 32 via the linkage element 40. During the aforesaid process, the protrusion 48 of the second locking element 38 can be moved from the opening 46 to the concentric track 44 by pulling of the linkage element 40, and then can be movable along the concentric track 44, so as to make the tray 36 foldable relative to the second pivot 34. In addition, with pulling of the linkage element 40, the first locking element 32 can be disengaged from the first pivot 26 to make the lower seat portion 30 foldable on the front leg portion 14 via the first pivot 26. Accordingly, the user can fold the tray 36 on the upper seat portion 28 and then can fold the lower seat portion 30 on the front leg portion 14 together with the upper seat portion 28 having the tray 36 folded thereon, so as to complete the operation of folding the child seat 18 on the front leg portion 14. Subsequently, the user can fold the front leg portion 14 and the stroller handle 12 relative to the rear leg portion 16 so that the foldable stroller 10 can be folded to form a compact size as shown in FIG. 2 for easy transport or convenient storage of the foldable stroller 10 when the foldable stroller 10 is not being used.

On the other hand, when the user operates the release handle 42 for releasing the second locking element 38 and the first locking element 32 via the linkage element 40, the protrusion 48 of the second locking element 38 can be moved back to the opening 46 (e.g. by a spring 39 as shown in FIG. 3, but not limited thereto), and then can be engaged with the binding surface 50 of the opening 46 for preventing folding of the tray 36 relative to the upper seat portion 28. Simultaneously, the first locking element 32 can be moved back to be engaged with the first pivot 26 (e.g. by a spring 33 as shown in FIG. 3, but not limited thereto) for preventing folding of the lower seat portion 30 relative to the front leg portion 14. As such, the child seat 18 can be in an unfolded state as shown in FIG. 1 steadily for holding an infant.

In summary, the present invention adopts the two-fold design of the child seat for reducing the folding volume of the child seat on the foldable stroller, so as to efficiently solve the prior art problem that the stroller frame cannot be folded to a compact size together with the child seat. Thus, the present invention can greatly improve folding and storage convenience of the foldable stroller.

It should be mentioned that the present invention could adopt a support design for steady storage of the foldable stroller when being folded with the child seat. For example, please refer to FIG. 1 and FIG. 2. As shown in FIG. 1 and FIG. 2, the upper seat portion 28 could have a support member 52 (e.g. a support foot structure, but not limited thereto) disposed thereon. Accordingly, when the child seat 18 is folded on the front leg portion 14 which is folded on the rear leg portion 16 together with the stroller handle 12 as shown in FIG. 2, the support member 52 can stand on a holding surface 53 (e.g. on the ground) for supporting the foldable stroller 10 on the holding surface 53 together with the front leg portion 14 and the stroller handle 12 folded relative to the rear leg portion 16, so as to improve storage convenience of the foldable stroller 10.

Figure 5:
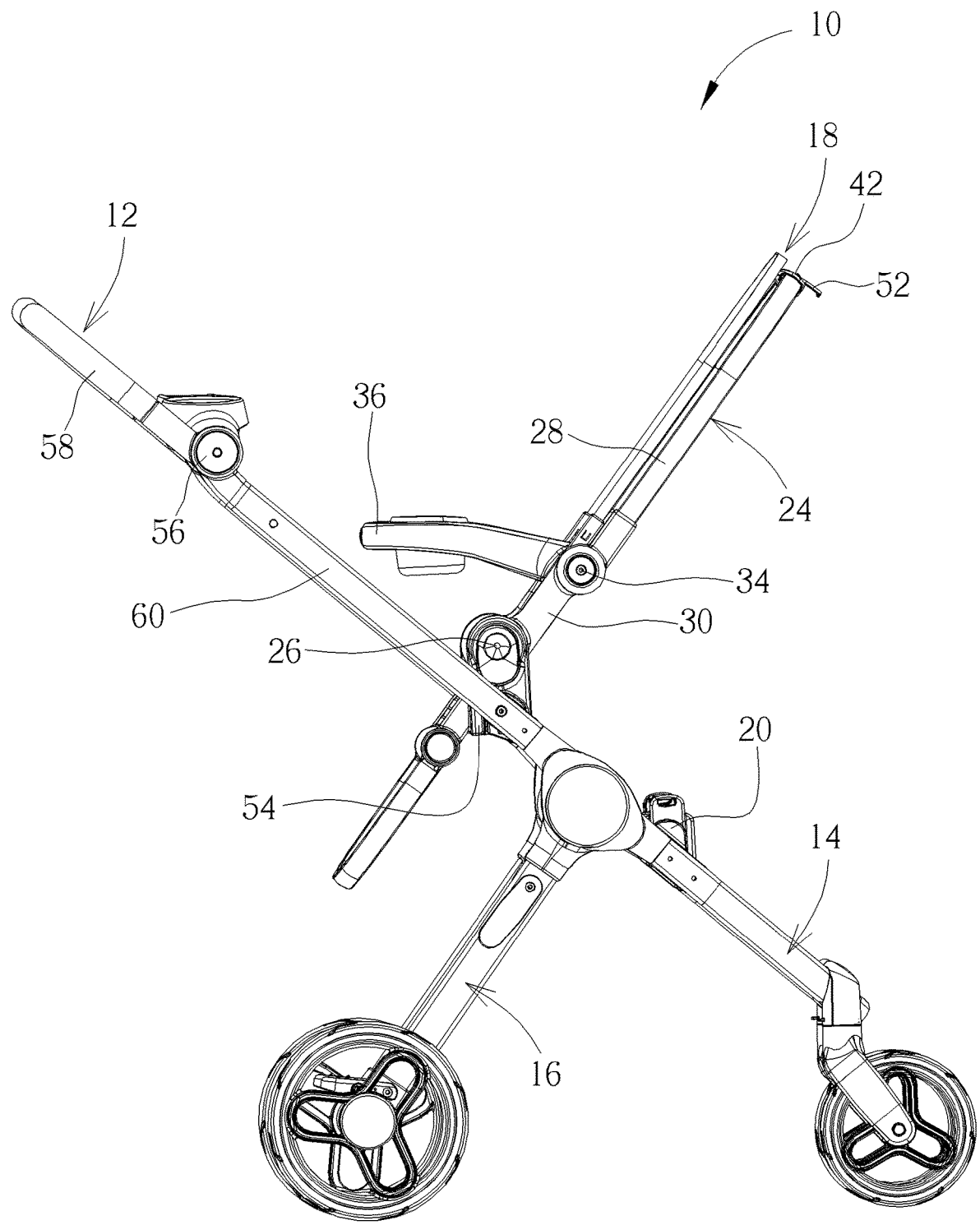
FIG. 5 is a side view of a foldable stroller in FIG. 1 having a child seat in a rearward facing position.

Furthermore, please refer to FIG. 5, which is a side view of the foldable stroller 10 in FIG. 1 having the child seat 18 in a rearward facing position. As shown in FIG. 5, the stroller handle 12 could have a second adaptor 54. Accordingly, the first pivot 26 can be detachably mounted on the second adaptor 54 to make the child seat 18 disposed on the stroller handle 12. This position allows the child seat 18 to be raised higher to the user, so as to provide better interaction between the infant and the user and allow the user to take care of the infant (e.g. feeding the infant) more conveniently.

Moreover, as shown in FIG. 1 and FIG. 2, the stroller handle 12 could have a handle hub 56, an upper handle portion 58, and a lower handle portion 60. The lower handle portion 60 is foldably connected to the upper handle portion 58 via the handle hub 56 and is pivoted to the rear leg portion 16. As such, when the front leg portion 14 and the lower handle portion 60 are folded relative to the rear leg portion 16, the upper handle portion 58 can be folded relative to the lower handle portion 60 via the handle hub 56, so as to reduce the folding length of the stroller handle 12 for making the foldable stroller 10 have a more smaller folded size.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child seat detachably mounted on a foldable stroller, the foldable stroller comprising a stroller handle, a front leg portion, and a rear leg portion, the stroller handle being foldably connected to the rear leg portion, the front leg portion being foldably connected to the rear leg portion and having a first adaptor, the child seat comprising:
   a seat frame having an upper seat portion and a lower seat portion, the upper seat portion being foldably connected to the lower seat portion; and
   a first pivot pivotably connected to the lower seat portion and detachably mounted on the first adaptor to make the child seat disposed on the front leg portion;
   wherein when the front leg portion and the stroller handle are folded relative to the rear leg portion, the upper seat portion is folded on the lower seat portion, and the lower seat portion is folded on the front leg portion via the first pivot together with the upper seat portion.

2. The child seat of claim 1 further comprising:
   a first locking element movably disposed in the lower seat portion for operably engaging with or disengaging from the first pivot;
   a second pivot pivoted to the lower seat portion and the upper seat portion;
   a second locking element movably disposed in the upper seat portion for operably engaging with or disengaging from the second pivot;
   a linkage element connected to the second locking element and the first locking element; and
   a release handle disposed on the upper seat portion and connected to the linkage element;
   wherein when the release handle is operated to pull the linkage element, the linkage element drives the second locking element to disengage from the second pivot for making the upper seat portion foldable on the lower seat portion via the second pivot, and the linkage element drives the first locking element to disengage from the first pivot for making the lower seat portion foldable on the front leg portion via the first pivot together with the upper seat portion;
   when the release handle is operated to release the linkage element, the first locking element is released to engage with the first pivot for preventing folding of the lower seat portion relative to the front leg portion, and the second locking element is released to engage with the second pivot for preventing folding of the upper seat portion relative to the lower seat portion.

3. The child seat of claim 2, wherein the linkage element is a cable passing through the second locking element to be connected to the first locking element for pulling or releasing the first locking element and the second locking element simultaneously.

4. The child seat of claim 2, wherein the second pivot has a concentric track formed therein and an opening communicated with the concentric track, the second locking element has a protrusion protruding toward the opening; when the release handle releases the linkage element, the second locking element is released to move the protrusion to be engaged with a binding surface of the opening for preventing folding of the upper seat relative to the lower seat portion; when the release handle pulls the linkage element to move the protrusion from the opening to the concentric track, the protrusion is movable along the concentric track for making the upper seat portion foldable relative to the lower seat portion.

5. The child seat of claim 2 further comprising:
   a tray foldably connected to the upper seat portion via the second pivot;
   wherein when the release handle is operated to pull the linkage element, the linkage element drives the second locking element to disengage from the second pivot for making the tray foldable on the upper seat portion via the second pivot;
   when the release handle is operated to release the linkage element, the second locking element is released to engage with the second pivot for preventing folding of the tray relative to the upper seat portion.

6. The child seat of claim 2 further comprising:
   an armrest foldably connected to the upper seat portion via the second pivot;
   wherein when the release handle is operated to pull the linkage element, the linkage element drives the second locking element to disengage from the second pivot for making the armrest foldable on the upper seat portion via the second pivot;
   when the release handle is operated to release the linkage element, the second locking element is released to engage with the second pivot for preventing folding of the armrest relative to the upper seat portion.

7. The child seat of claim 1, wherein the stroller handle has a second adaptor, and the first pivot is detachably mounted on the second adaptor to make the child seat disposed on the stroller handle.

8. The child seat of claim 1, wherein the upper seat portion has a support member disposed thereon; when the lower seat portion is folded on the front leg portion via the first pivot together with the upper seat portion, the support member stands on a holding surface for supporting the foldable stroller on the holding surface together with the front leg portion and the stroller handle folded relative to the rear leg portion.

9. A foldable stroller comprising:
   a rear leg portion;
   a stroller handle foldably connected to the rear leg portion;
   a front leg portion foldably connected to the rear leg portion, the front leg portion having a first adaptor; and
   a child seat comprising:
      a seat frame having an upper seat portion and a lower seat portion, the upper seat portion being foldably connected to the lower seat portion; and
      a first pivot foldably connected to the lower seat portion and detachably mounted on the first adaptor to make the child seat disposed on the front leg portion;

wherein when the front leg portion and the stroller handle are folded relative to the rear leg portion, the upper seat portion is folded on the lower seat portion, and the lower seat portion is folded on the front leg portion via the first pivot together with the upper seat portion.

10. The foldable stroller of claim 9, wherein the child seat further comprises:
a first locking element movably disposed in the lower seat portion for operably engaging with or disengaging from the first pivot;
a second pivot pivoted to the lower seat portion and the upper seat portion;
a second locking element movably disposed in the upper seat portion for operably engaging with or disengaging from the second pivot;
a linkage element connected to the second locking element and the first locking element; and
a release handle disposed on the upper seat portion and connected to the linkage element;
wherein when the release handle is operated to pull the linkage element, the linkage element drives the second locking element to disengage from the second pivot for making the upper seat portion foldable on the lower seat portion via the second pivot, and the linkage element drives the first locking element to disengage from the first pivot for making the lower seat portion foldable on the front leg portion via the first pivot together with the upper seat portion;
when the release handle is operated to release the linkage element, the first locking element is released to engage with the first pivot for preventing folding of the lower seat portion relative to the front leg portion, and the second locking element is released to engage with the second pivot for preventing folding of the upper seat portion relative to the lower seat portion.

11. The foldable stroller of claim 10, wherein the linkage element is a cable passing through the second locking element to be connected to the first locking element for pulling or releasing the first locking element and the second locking element simultaneously.

12. The foldable stroller of claim 10, wherein the second pivot has a concentric track formed therein and an opening communicated with the concentric track, the second locking element has a protrusion protruding toward the opening; when the release handle releases the linkage element, the second locking element is released to move the protrusion to be engaged with a binding surface of the opening for preventing folding of the upper seat portion relative to the lower seat portion; when the release handle pulls the linkage element to move the protrusion from the opening to the concentric track, the protrusion is movable along the concentric track for making the upper seat portion foldable relative to the lower seat portion.

13. The foldable stroller of claim 10, wherein the child seat further comprises:
a tray foldably connected to the upper seat portion via the second pivot;
wherein when the release handle is operated to pull the linkage element, the linkage element drives the second locking element to disengage from the second pivot for making the tray foldable on the upper seat portion via the second pivot;
when the release handle is operated to release the linkage element, the second locking element is released to engage with the second pivot for preventing folding of the tray relative to the upper seat portion.

14. The foldable stroller of claim 10, wherein the child seat further comprises:
an armrest foldably connected to the upper seat portion via the second pivot;
wherein when the release handle is operated to pull the linkage element, the linkage element drives the second locking element to disengage from the second pivot for making the armrest foldable on the upper seat portion via the second pivot;
when the release handle is operated to release the linkage element, the second locking element is released to engage with the second pivot for preventing folding of the armrest relative to the upper seat portion.

15. The foldable stroller of claim 9, wherein the stroller handle has a second adaptor, and the first pivot is detachably mounted on the second adaptor to make the child seat disposed on the stroller handle.

16. The foldable stroller of claim 9, wherein the upper seat portion has a support member disposed thereon; when the lower seat portion is folded on the front leg portion via the first pivot together with the upper seat portion, the support member stands on a holding surface for supporting the foldable stroller on the holding surface together with the front leg portion and the stroller handle folded relative to the rear leg portion.

17. The foldable stroller of claim 9, wherein the stroller handle has a handle hub, an upper handle portion, and a lower handle portion, the lower handle portion is foldably connected to the upper handle portion via the handle hub and is pivoted to the rear leg portion; when the front leg portion and the lower handle portion are folded relative to the rear leg portion, the upper handle portion is folded relative to the lower handle portion via the handle hub.

* * * * *